Patented Dec. 23, 1952

2,623,000

UNITED STATES PATENT OFFICE 2,623,000

ANTIHYPERTENSION COMPOSITION

Frank T. Kimball, South Norwalk, Conn., assignor to Ri-trate Corporation, a corporation of New York No Drawing. Application April 1, 1949,
Serial No. 85,029

4 Claims. (Cl. 167—55)

This invention relates to an anti-hypertension factor and the method of making it from rice.

Many attempts have been made, some of them successfully, to discover materials to be administered to humans with high blood pressure. I have now discovered a factor for this purpose and a convenient and effective method of manufacturing it in the form of a product containing not more than about 50% by weight of total carbohydrates.

My new product is adapted to be taken orally in such relatively small amounts or in admixture in such small proportions with other items of the diet that the product is not objectionable from an appetite standpoint. The product is effective in maintaining the blood pressure of a hypertensive person at approximately the normal level regardless of what means may have been used originally to bring down the blood pressure to this level. The product may be consumed with a variety of other foods including particularly fruits, fruit juices, bread, sugar, lean meat, eggs, vegetables and like items that are low in content of sodium and cholesterol.

Briefly stated, the invention comprises the herein described factor and the method of making it from rice. The method of making it includes contacting the rice in comminuted condition with an aqueous solution of a non-toxic alkali that is soluble in water to such concentration as to make the pH of the solution about 12 to 13.5, continuing the contact until the material of the rice which is dispersible in such solution is dispersed, then withdrawing the liquid from the solid phase, mixing the separated liquid phase with a non-toxic acid in proportion to establish the pH at a level not above 7 but above the level of pH at which the dispersed material, after coagulation by the acid, will dissolve, so that the material originally dispersed in the aqueous solution coagulates and remains coagulated, and then separating the coagulated material from the remaining liquid phase. The coagulated material containing the anti-hypertension factor is suitably dried and milled before distribution for use.

As the rice used there is selected any rice of food quality. The rice is comminuted before the extraction. Contact of the rice with the aqueous solution to be added is made more convenient if the rice is ground to the form of a meal and not to a flour. Thus I use to advantage milled rice the major part of which is between 20 and 80 mesh.

The alkali used must be non-toxic and soluble in water to the extent to give the pH recited above. These requirements limit the alkalies largely to compounds of sodium, potassium, other alkali metals, ammonia, and calcium hydroxide. There is no advantage in using any of the more costly alkali metals or even ammonium or calcium compounds. For this reason I prefer to use sodium hydroxide or potassium hydroxide. Potassium hydroxide is preferable because its use introduces no sodium ion. Even when the sodium hydroxide is used, however, the amount of sodium ion left in the finished anti-hypertension factor is not large and ordinarily is not sufficient to be disturbing to the patient in use of the finished factor. Other alkali metal compounds that may be used in addition to the hydroxide are the carbonates and alkaline phosphates of sodium or potassium, that is the phosphates which do not contain an acidic hydrogen atom.

The concentration of the dissolved alkali in the alkaline solution should be such as to give a pH of approximately 12 to 13.5. When the alkali is the hydroxide of sodium or potassium, I use about 0.05 to 0.15 molar solutions.

The contact of the alkali solution with the rice is effected at approximately room temperature. This means within the range of about 0° to 40° C. At temperatures substantially above 40° C., there is difficulty in separating the desired anti-hypertension factor from the starch of the rice. At temperatures substantially below 0°, the solution begins to freeze.

As the acid used to coagulate the material dispersed in the alkali solution, there is used a non-toxic, water soluble acid that is inert in the reaction except for establishing a favorable pH. Hydrochloric acid is preferred. Other acids that may be used are phosphoric, citric, or acetic acids.

The acid is added in proportion to establish the pH at a level of 7 or below and suitably within the range of 6 to 7. If a factor of the highest effectiveness per unit of weight is not desired, the proportion of acid may be increased to lower the pH to any point between 4 and 7. At a pH below 4, the coagulated original dispersed material begins to dissolve to a large extent.

The invention will be further illustrated by detailed description in connection with the following specific example of the production of the anti-hypertension factor.

Example 1

In containers of stainless steel there are placed 1800 parts by weight of polished rice ground to the form of a meal and 9,000 parts of water. The containers are tumbled on a conventional device for rotating drums or the like until the rice is thoroughly wetted. Then there is introduced a solution of potassium hydroxide containing 44 parts of the hydroxide on the dry basis and 400 of water. The whole mass in the stainless steel containers is now tumbled for 1.5 hours at about 20° C. This causes dispersion of material which is dispersible in the alkali solution.

The tumbled mass is then allowed to stand overnight. This standing causes settling of the remaining solid material. The supernatant liquid containing the dispersed material is withdrawn to a stainless steel tank. (The solid material is set aside for further washing, as by the addition of water, stirring, settling and decantation, to give a decanted liquor to be used as makeup water in a new batch.) The said supernatant liquid is passed through a supercentrifuge of the cream separator type. The solids which are thrown out in the centrifuging are discarded.

The liquid phase from the centrifuge may be sprayed with a small amount of alcohol to break the foam upon the surface. The liquid is stirred with hydrochloric acid added as dilute aqueous acid of about 10% concentration of actual HCl, the acid being added slowly until the pH is established at 5.2.

This acidification causes the flocculation of a solid, originally dispersed material which is the anti-hypertension factor desired. This material is separated by centrifuging in the supercentrifuge of the kind described. The solid which is collected in the bowl in this operation is washed with several portions of water. The washed material is removed from the bowl, spread in thin layers on trays and dried overnight at 75° C. It is then pulverized in a standard type of mill, as to 150 mesh or finer.

The product is a light brown solid representing in weight approximately 4% of the rice which was used as the raw material. It contains less than 50% by weight of total carbohydrates from the rice and in most runs less than 30%. When administered to patients of pronounced hypertension condition and in whom the blood pressure has been restored approximately to normal by other treatment, the product serves to keep the blood pressure normal even though there is used along with the new product a diet including the great variety of materials given above. For such purpose the amount of the new anti-hypertension factor should be about 2.5 ounces a day on the 30% carbohydrate basis. For the product containing 50% carbohydrate the daily intake of the material for control of hypertension should be normally about 3.5 ounces. Much larger amounts may be consumed without danger but are unnecessary.

The anti-hypertension factor made as described may be mixed into beverages, as into orange juice. It may be incorporated into solid foods or puddings made with the ingredients described.

For some purposes the anti-hypertension factor is mixed with inositol or a methyl donor or both.

When inositol is used, it and the factor coact to increase the formation of phospholipids which have the useful property of dissolving cholesterol under conditions of use of the mixed anti-hypertension factor and inositol. For this purpose, the inositol is used in the proportion of about 0.7 to 7 parts by weight for 100 parts of the anti-hypertension factor containing not more than about 50% of total carbohydrates.

The methyl donor used improves the effectiveness of less than the normal dosage of the anti-hypertension factor in controlling the blood pressure. The methyl donor selected is any one of those conventionally used therapeutically to supply methyl groups in the processes of metabolism. Examples of the methyl donors that may be used are methionine, choline, betaine and lecithin. They may be used alone or mixed with one another and to the extent of 1 to 15 parts by weight to 100 parts of the hypertension factor made as described above. Also the inositol and methyl donor may be used jointly with the anti-hypertension factor.

It will be understood that it is intended to cover all changes and modifications of the example of the invention herein chosen for the purpose of illustration which do not constitute departures from the spirit and scope of the invention.

What I claim is:

1. The anti-hypertension composition comprising substantially all of the alkali dispersible acid-coagulable fractions of rice, an admixed methyl donor capable of supplying methyl groups in the processes of metabolism, and inositol admixed in the proportion of 0.7 to 7 parts for 100 parts by weight of said composition, the said fraction containing 1 to 15 parts of admixed methyl donor and not more than 50 parts of carbohydrate for 100 parts of the said composition.

2. A composition as specified in claim 1 in which the methyl donor is choline.

3. The composition as specified in claim 1 in which the methyl donor is betaine.

4. A composition as specified in claim 1 in which the methyl donor is lecithin.

FRANK T. KIMBALL.

REFERENCES CITED

The following references are of record in the file of this patent:

UNITED STATES PATENTS

| Number | Name | Date |
| --- | --- | --- |
| 2,283,817 | Martin | May 19, 1942 |
| 2,381,343 | Furter | Aug. 7, 1945 |
| 2,412,153 | Huzenlaub | Dec. 3, 1946 |
| 2,417,841 | Ruskin | Mar. 25, 1947 |
| 2,464,240 | Krebs | Mar. 15, 1949 |

OTHER REFERENCES

Osborne, Journal of Biological Chemistry, September 1915, volume 22, pages 274 and 275.

U. S. Dispensatory, 24th edition (1947), pages 1400, 1401, 1488.

King, American Dispensatory (1870), page 590.

Cecil, Textbook of Medicine, 7th edition (1947), pages 1156 and 1157.

Basu, Chemical Abstracts, volume 31, pages 8630, 8631 (1937).

Practical Physiological Chemistry, 12th edition (1947), pages 943 and 944.

Rosenberg, Chemistry and Physiology of Vitamins (1942), pages 275 to 280.

Harrow, Textbook of Biochemistry (1947), pages 337 and 368.